(12) United States Patent
Lee (10) Patent No.: US 8,156,526 B2
(45) Date of Patent: Apr. 10, 2012

(54) APPARATUS AND METHOD FOR CONTROLLING SCREEN LAYOUT IN DIGITAL BROADCAST RECEIVER FOR RECEIVING MOVING PICTURE CONTENT

(75) Inventor: Ji-Young Lee, Seoul (KR)

(73) Assignee: Alticast Corp., Seoul (KR)

( * ) Notice: Subject to any disclaimer, the term of this patent is extended or adjusted under 35 U.S.C. 154(b) by 659 days.

(21) Appl. No.: 12/053,031

(22) Filed: Mar. 21, 2008

(65) Prior Publication Data

US 2009/0064225 A1 Mar. 5, 2009

(30) Foreign Application Priority Data

Sep. 5, 2007 (KR) .................. 10-2007-0090071

(51) Int. Cl.
*H04N 5/445* (2006.01)
*G06F 3/00* (2006.01)
*G06F 13/00* (2006.01)

(52) U.S. Cl. ............... 725/44; 725/40; 725/45; 725/46; 725/47; 725/48; 725/50; 725/51; 725/52; 725/53; 725/59; 725/61

(58) Field of Classification Search ............. 725/40, 725/44–48, 50–53, 59, 61
See application file for complete search history.

(56) References Cited

U.S. PATENT DOCUMENTS

| | | | |
|---|---|---|---|
| 6,240,555 B1* | 5/2001 | Shoff et al. ............... | 725/110 |
| 6,397,387 B1* | 5/2002 | Rosin et al. ............... | 725/44 |
| 6,425,129 B1* | 7/2002 | Sciammarella et al. ....... | 725/38 |
| 7,174,512 B2* | 2/2007 | Martin et al. ............ | 715/719 |
| 7,590,995 B2* | 9/2009 | Nakamura et al. .......... | 725/52 |
| 2001/0020297 A1* | 9/2001 | Inoue ..................... | 725/39 |
| 2003/0074662 A1* | 4/2003 | Istvan et al. ............ | 725/38 |
| 2005/0177849 A1* | 8/2005 | Pietraszak et al. ........ | 725/44 |
| 2006/0150215 A1* | 7/2006 | Wroblewski .............. | 725/47 |
| 2007/0101375 A1* | 5/2007 | Haberman ............... | 725/86 |
| 2007/0130525 A1* | 6/2007 | Murphy et al. ........... | 715/747 |
| 2009/0165048 A1* | 6/2009 | Nishimura ............... | 725/39 |
| 2010/0125874 A1* | 5/2010 | Ahn et al. ............... | 725/41 |
| 2010/0169915 A1* | 7/2010 | Lee ..................... | 725/32 |

* cited by examiner

*Primary Examiner* — Jason Salce
(74) *Attorney, Agent, or Firm* — Jefferson IP Law, LLP (57) ABSTRACT

Disclosed is an apparatus and a method for screen display in a digital broadcast receiver for receiving moving picture contents. The method includes: receiving head-end side data including configuration data of lattice-type moving picture contents sent via a broadcasting network, and converting the received head-end side data into content picture configuration data; editing the content picture configuration data and configuring a curved-type circular selection picture so as to display the edited content picture configuration data through the curved-type circular selection picture on a display means of a user terminal; and displaying the configured curved-type circular selection picture containing the moving picture contents on the display means of the user terminal.

10 Claims, 4 Drawing Sheets

APPARATUS AND METHOD FOR CONTROLLING SCREEN LAYOUT IN DIGITAL BROADCAST RECEIVER FOR RECEIVING MOVING PICTURE CONTENT

PRIORITY

This application claims the benefit under 35 U.S.C. §119 (a) of an application entitled "Apparatus and Method for Controlling Screen Layout in Digital Broadcast Receiver for Receiving Moving Picture Content" filed in the Korean Industrial Property Office on Sep. 5, 2007 and assigned Serial No. 2007-90071, the contents of which are incorporated herein by reference.

BACKGROUND OF THE INVENTION

1. Field of the Invention

The present invention relates to an apparatus and a method for receiving a digital broadcast in a digital broadcast system, and more particularly to an apparatus and a method for screen display in a digital broadcast receiver for receiving a moving picture content.

2. Description of the Related Art

When a particular key is input by a user, for the user's convenience, a digital broadcast receiver displays an Electronic Program Guide (EPG) as a list of channels on the air, so as to help the user's channel selection. In the channel selection using the EPG, a user either can operate a channel up/down key of a remote controller in order to find a desired channel, or can directly input a channel number confirmed through the EPG. However, in the case of the usual channel selection scheme as described above, the larger the number of channels served by digital broadcasting is, the greater the necessary time and caused inconvenience during the user's channel search becomes. Accordingly, a recent digital broadcast receiver provides a channel search screen, which sequentially displays multiple moving picture channels on the air in a lattice-type list (hereinafter, referred to as a "lattice-type moving picture channel list") on one screen. Hence, the user can simultaneously search for multiple channels on the air.

Conventionally, in the lattice-type moving picture channel list as above, for example, moving pictures of 12 channels are displayed in a 4×3 array on one screen. However, in the lattice-type moving picture channel list as above, small-sized moving pictures are simultaneously displayed on a screen having a limited size, which may considerably drop a user's visibility. As a result, in spite of the original intention of development thereof, the lattice-type moving picture channel list rather causes difficulty in selecting a channel, and the frequency of using the lattice-type moving picture channel list is thus very low. While the selection of broadcast channels is described as a representative example of use of the lattice-type moving picture channel list as above, the above-described example is not the only example. Even when various moving picture contents (e.g., home shopping, on-demand type moving picture contents, etc.) capable of providing the lattice-type moving picture channel list as above are selected, the same problems as described above can be raised.

Consequently, it is required to quickly prepare a method for effective layout of multiple moving picture contents, which can improve the visibility of the multiple moving picture contents, so that a user can easily search for and select the contents.

SUMMARY OF THE INVENTION

Accordingly, the present invention has been made to solve the above-stated problems occurring in the prior art, and the present invention provides an apparatus and a method for controlling a screen layout, which can improve a user's visibility in a digital broadcast receiver for receiving moving picture contents.

Also, the present invention provides an apparatus and a method for controlling a screen layout, which can easily search for multiple moving picture channels in a digital broadcast receiver.

Further, the present invention provides an apparatus and a method for converting a lattice-type moving picture channel list into a curved-type circular selection picture and then providing the curved-type circular selection picture on a screen of a digital broadcast receiver.

In accordance with an aspect of the present invention, there is provided an apparatus for controlling a screen layout in a digital broadcast receiver, the apparatus including: a data reception conversion unit for receiving head-end side data including configuration data of lattice-type moving picture contents sent via a broadcasting network and then converting the received head-end side data into content picture configuration data; and a content picture configuration unit for editing the content picture configuration data provided by the data reception conversion unit and then controlling a display means of a user terminal so as to display the edited content picture configuration data through a circular selection picture on the display means.

In accordance with another aspect of the present invention, there is provided a method for controlling a screen layout in a digital broadcast receiver, the method including the steps of receiving head-end side data including configuration data of lattice-type moving picture contents sent via a broadcasting network, and converting the received head-end side data into content picture configuration data; editing the content picture configuration data and configuring a curved-type circular selection picture so as to display the edited content picture configuration data through the curved-type circular selection picture on a display means of a user terminal; and displaying the configured curved-type circular selection picture containing the moving picture contents on the display means of the user terminal.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described in detail with reference to the accompanying drawings. In the following description of the present invention, a detailed description of known functions and configurations incorporated herein will be omitted when it may make the subject matter of the present invention rather unclear.

Generally, in digital broadcasting, a broadcast signal is converted into a digital signal and is then transmitted via a satellite, a terrestrial microwave, or a cable. A user receives a broadcast signal through a wire/wireless digital broadcast receiver, and views a broadcast program through a desired broadcast channel. Recently, various moving picture content services using a digital broadcast receiver are provided together with the existing terrestrial broadcasting and cable broadcasting. As used herein, the term "moving picture content" includes a moving picture content in a general sense, a broadcasting service provided on a channel-by-channel basis, and each purchasable on-demand type broadcast item.

The present invention has been made in order to achieve a more convenient use of a digital broadcasting content by reducing time for selection of a content to be used by a user, and by improving the visibility of a suggested content list. A high-speed editing provided in a display form for improving the visibility of the content list and reducing channel switching time according to the present invention will be described with reference to a technical support environment.

A user terminal environment for application of the present invention can be implemented even in a simple channel receiver (i.e. a zapper box) for performing only Free-To-Air (FTA) reception, as well as in a standard middleware environment, such as Multimedia Home Platform (MHP), Open Cable Application Platform (OCAP), Advanced Common Application Platform (ACAP) etc., and in a non-standard middleware environment.

Figure 1:
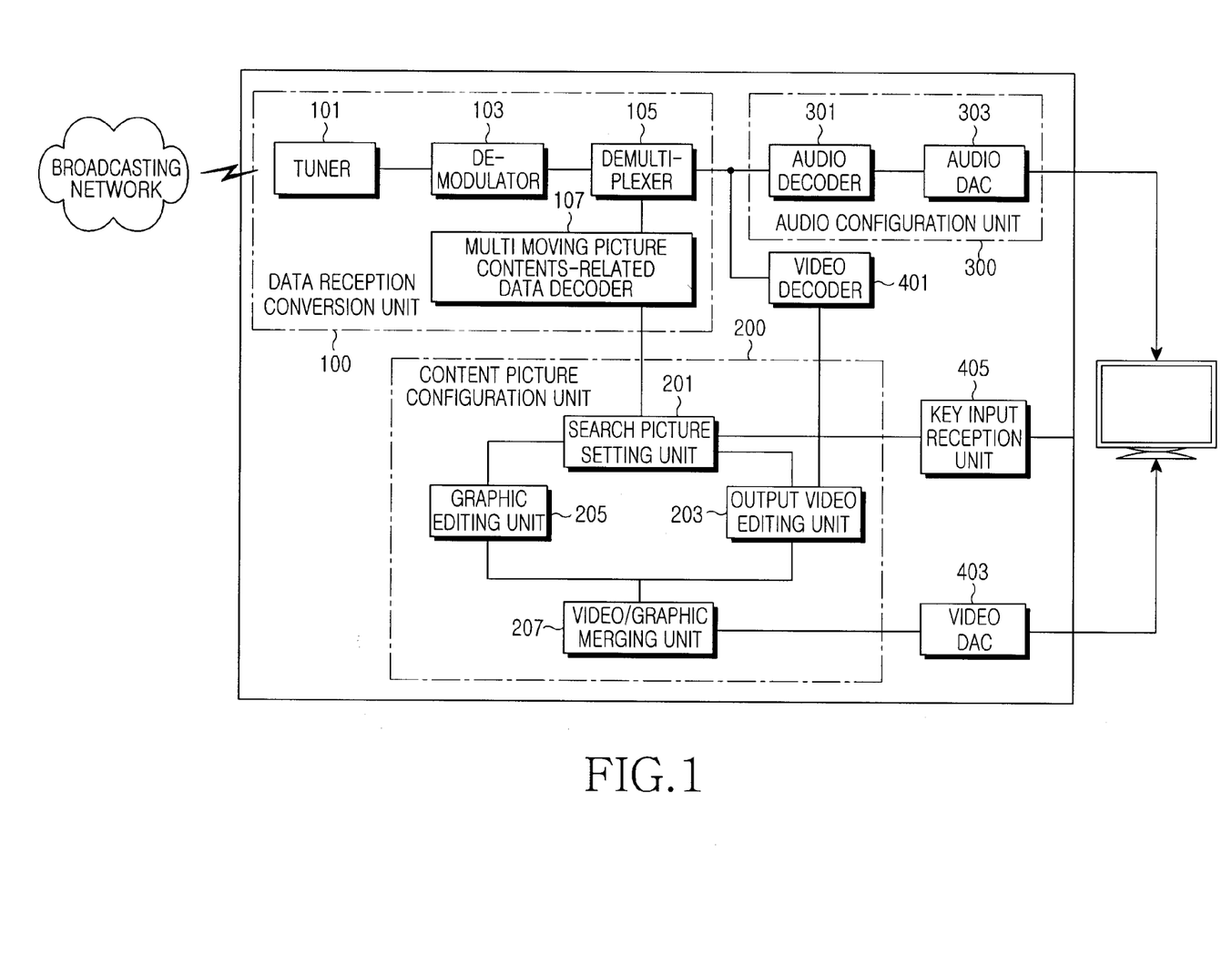
FIG. 1 is a block diagram illustrating the configuration of an apparatus for controlling a screen layout of multiple moving picture contents in a digital broadcast receiver according to the present invention.

FIG. 1 is a block diagram illustrating the configuration of an apparatus for controlling a screen layout of multiple moving picture contents in a digital broadcast receiver according to the present invention.

The digital broadcast receivers include various terminals capable of receiving a digital broadcast, such as a digital TV, a computer device equipped with a broadcast receiving module, a notebook computer, a Personal Multimedia Player (PMP), a mobile terminal, and others. Hereinafter, for convenience of description, the digital broadcast receiver is referred to as a "user terminal."

The user terminal includes a data reception conversion unit 100, a content picture configuration unit 200, an audio configuration unit 300, and a display means, such as a Liquid Crystal Display (LCD). The data reception conversion unit 100 receives head-end side data produced by a content provider (i.e. a head-end corresponding to the transmission side of a broadcasting system) and then sent via a broadcasting network, and converts the received head-end side data into content picture configuration data and audio configuration data. Based on the data received and converted by the data reception conversion unit 100, the content picture configuration unit 200 configures a screen to be displayed. The audio configuration unit 300 outputs an audio signal matching with a focus content selected by a user in the output content picture. The audio configuration unit 300 can be optionally included.

The data reception conversion unit 100 receives head-end side data including moving pictures of contents, moving picture-related data, and configuration data of lattice-type moving picture contents, and converts the received head-end side data into content picture configuration data and audio configuration data. Then, the data reception conversion unit 100 delivers content selection data of the user to the head-end side of the content provider. Moving picture-related data of the head-end side data corresponds to data related to moving pictures, which include text data related to a content, still picture data, audio clip data, graphic data, etc. Also, the configuration data of the lattice-type moving picture contents refers to data related to a layout of a lattice-type moving picture channel list including arrangement positions, sizes, and identification information of multiple moving picture contents arranged in a lattice form.

In addition, referring to FIG. 1, the data reception conversion unit 100 includes a tuner 101, a demodulator 103, a demultiplexer 105, and a data decoder 107. The tuner 101 selects and receives a particular frequency band signal among broadcast signals received through a broadcasting network. Then, the demodulator 103 demodulates a broadcast signal of the particular frequency band received by the tuner 101. The demultiplexer 105 extracts data of each signal type from the broadcast signal demodulated by the demodulator 103. Then, the data decoder 107 decodes each piece of configuration data of multiple moving picture contents and data (i.e. text data, still picture data, audio clip data, graphic data, etc.) other than the moving pictures from among the data demultiplexed by the demultiplexer 105, and delivers the decoded data to the content picture configuration unit 200. As used herein, the multiple moving picture contents refer to a plurality of moving picture contents simultaneously displayed on one screen for channel search by a user.

The content picture configuration unit 200 analyzes the content picture configuration data input from the data reception conversion unit 100 and the content selection data of the user input through a key input reception unit 405, and then displays multiple moving picture contents on a single circular selection picture. For example, the circular selection picture may have a ring-shaped structure in which multiple moving picture contents are arranged side by side while the first moving picture content and the last moving picture content are connected to each other. Namely, when a left or right direction key is continuously input through the key input reception unit 405 and if each of moving picture contents has been assigned a number, the circular selection picture is circularly displayed according to content selection data of the user, for instance, in an order of, 1-2-3-4-1-2-3-4-1-2. Also, the content picture configuration unit 200 edits a content selected by the user so that the content selected by the user is displayed as an enlarged focus content having a larger size than the other moving picture contents. Further, the video data edited by the content picture configuration unit 200 is converted into analog data by a video Digital-to-Analog Converter (DAC) 403, and the converted analog data is then displayed by the display means. Also, the content picture configuration unit 200 analyzes key input data of the user. When final content selection data (which refers to data finally selected to be used from among moving picture contents presented by a user) is input, the content picture configuration unit 200 delivers the final content selection data to the data reception conversion unit 100, so as to transmit the final content selection data to the head-end side of the content provider.

In addition, referring to FIG. 1, the content picture configuration unit 200 includes a search picture setting unit 201, an output video editing unit 203, a graphic editing unit 205, and a video/graphic merging unit 207. The search picture setting unit 201 receives the content picture configuration data and the content selection data, and then delivers not only the received content picture configuration data and content selection data but also a screen layout control signal to the graphic editing unit 205 and the output video editing unit 203. Then, by using data input from the search picture setting unit 201, the output video editing unit 203 displays multiple moving picture contents in a circular selection picture by the display means of the user terminal. Also, the output video editing unit 203 controls the display means of the user terminal so that a focus content selected by the user from among the multiple moving picture contents is displayed in an enlarged size larger than the other moving picture contents. Also, according to the screen layout control signal input from the search picture setting unit 201, the graphic editing unit 205 not only controls the display of a graphic for a screen layout other than the multiple moving picture contents, but also controls the positions of displayed moving pictures so that a moving picture of the focus content among the multiple moving picture contents can be displayed at a predetermined region on a screen. The video/graphic merging unit 207 merges a screen graphic output from the graphic editing unit 205 with the multiple moving picture contents output from the output video editing unit 203, thereby generating a final screen to be displayed.

Further, the audio configuration unit 300 outputs, through an audio Digital-to-Analog Converter (DAC) 303, audio data matching with the focus content from among audio configuration data input from the data reception conversion unit 100. Depending on whether the user terminal outputs an audio signal, the audio configuration unit 300 can be optionally included in the apparatus for controlling a screen layout of multiple moving picture contents.

Figure 2:
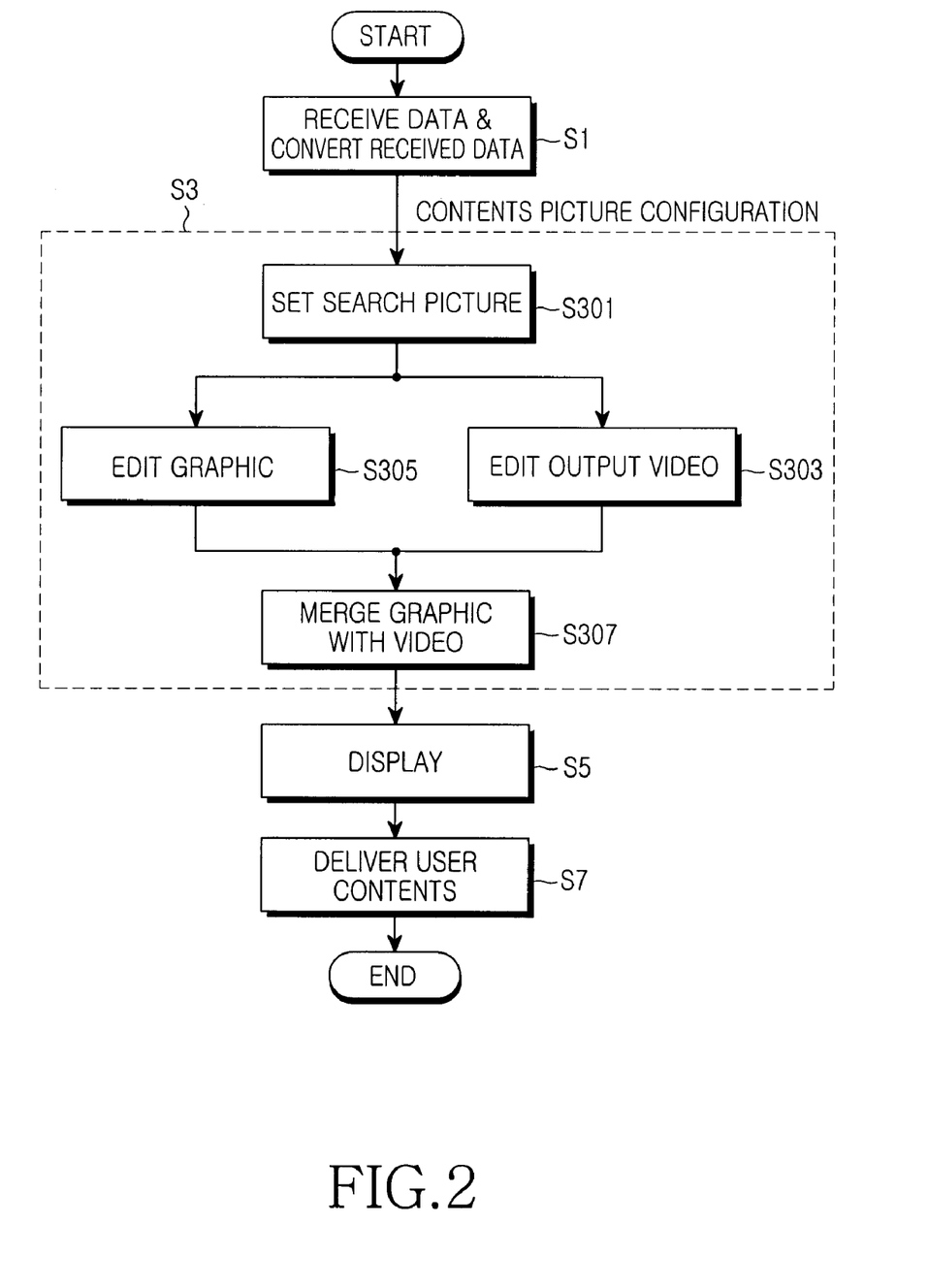
FIG. 2 is a flowchart showing a method for controlling a screen layout of multiple moving picture contents in a digital broadcast receiver according to the present invention.

Referring to FIG. 2, a description will be given of a method for controlling a screen layout of multiple moving picture contents in the digital broadcast receiver according to the present invention.

FIG. 2 is a flowchart showing a method for controlling a screen layout of multiple moving picture contents in a digital broadcast receiver according to the present invention.

Figure 3:
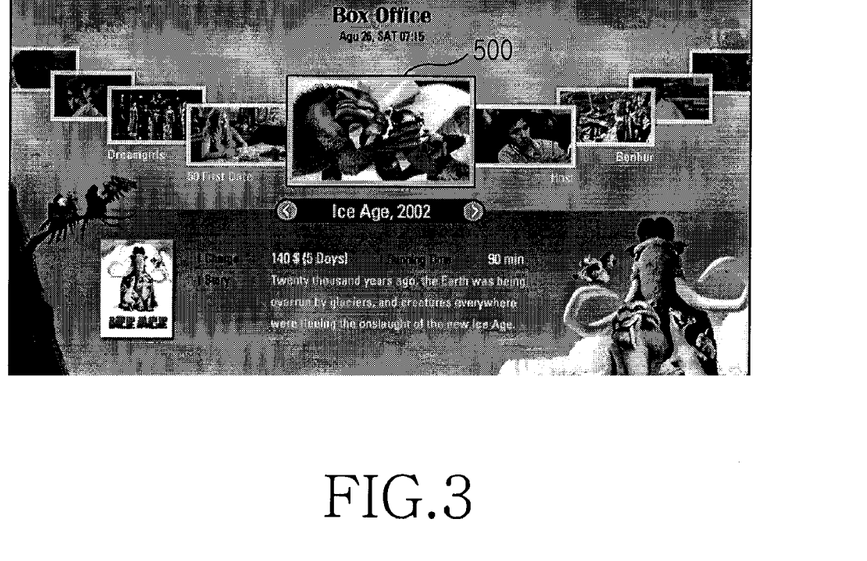
FIG. 3 illustrates a picture example of a first embodiment in which a method for controlling a screen layout of multiple moving picture contents is applied so as to configure a broadcast channel guide in a digital broadcast receiver according to the present invention.

The following description is based on an example of a channel guide according to the first embodiment of the present invention as illustrated in FIG. 3.

First, the head-end side of a content provider produces a lattice-type moving picture content list, and then sends the produced lattice-type moving picture content list to a user terminal through a broadcasting network. At this time, the sent head-end side data includes various pieces of data, such as moving pictures of contents, moving picture-related data, the lattice-type moving picture content list, and the like. The head-end side data additionally includes a media source for defining a layout of a screen to be displayed by a display means of the user terminal, so that the layout of the display screen can be determined based on the media source sent to the user terminal. In addition, in the case of using a moving picture content service, if any change occurs after initial transmission of a media source, the head-end side can apply only the change to the initially transmitted media source and then send the changed media source together with other data. Moreover, the media source can be implemented in various other ways. For example, the media source can be set in advance in the digital broadcast receiver, so as to receive the head-end side data and then configure a moving picture content screen based on the received head-end side data.

The head-end side data produced and sent by the head-end side of the content provider through the broadcasting network as described above is received by the data reception conversion unit 100, which then converts the received head-end side data into content picture configuration data and audio configuration data (step S1).

The converted content picture configuration data from the data reception conversion unit 100 and content selection data input through the key input reception unit 405 after content search by a user are input to the search picture setting unit 201, which then delivers a screen layout control signal to the graphic editing unit 205 and the output video editing unit 203 (S301).

By using the screen layout control signal delivered by the search picture setting unit 201, the output video editing unit 203 arranges multiple moving picture contents through, for example, an oval-shape circular selection picture as depicted in FIG. 3, on the display means of the user terminal. In addition, it is noted that, in the layout shown in FIG. 3, the focus content selected through channel search of the user, i.e. through the user's input of a channel up/down key or a left/right direction key, is displayed at the center of the screen while having a most enlarged size larger than the other moving picture contents (S303). In the case of the oval-shape circular selection picture according to the first embodiment illustrated in FIG. 3, from among various curved type circular selection pictures, it is possible to overlap partial regions of the multiple moving picture contents along the oval, so as to arrange a larger number of moving picture contents in one screen. Further, the moving picture contents are arranged in such a manner that the focus content has the largest size, and the farther a moving picture content from the focus content is, the smaller the moving picture content becomes, which can build a sense of perspective, and thus can improve the visibility of the user. This screen layout can overcome the problem of visibility degradation, which is the biggest shortcoming of the lattice-type moving picture content list, so that the user can easily search for contents.

Also, the graphic editing unit 205 controls the screen graphic so that a graphic display picture other than multiple moving picture contents to be displayed on the display means of the user terminal and moving picture-related data of the focus content can be displayed in a region excluding the multiple moving picture contents (S305). Namely, in step S305, the moving picture contents are provided along with text data, still picture data, graphic data, etc., all of which correspond to information useful for content selection of the user. In the first embodiment illustrated in FIG. 3, broadcast program information of a relevant channel according to time is displayed as the moving picture contents, and the other region except for the region displaying the multiple moving picture contents can be utilized in various ways, for example, it can be utilized in order to display an advertisement image, contents-related information, and the like.

In step S307, the video/graphic merging unit 207 merges a picture graphic output in the graphic editing step with multiple moving picture contents output in the graphic editing step and the output video editing step, thereby generating a content picture to be displayed. In FIG. 2, step S3 includes steps S301, S303, S305, and S307.

In step S5, the content screen edited in the content screen layout step S3 is converted into video analog data by the video DAC 403, and is then displayed on a display means of the user terminal. Also, audio data matching with the focus content is converted into audio analog data by the audio DAC 303, and is then output through a speaker mounted in the user terminal.

Thereafter, when the final content selection data of the user selected through the moving picture content screen displayed on the display means of the user terminal is received through the key input reception unit 405 (i.e. when the final content selection data selected to use by the user from among presented moving picture contents has been input), the data input through the key input reception unit 401 is delivered to the head-end side of the content provider, so that the user can receive and use the moving picture contents (S7).

Further, display switching of the multiple moving picture contents arranged and displayed on the curved type circular selection picture can be performed through one switching mode selected from among a Normal mode, a Fade-In mode, a Fade-Out mode, a Cross-Fade mode, a Wipe mode, a Page-Effect mode, a Split mode, and a Zoom mode. In the Normal mode, an existing content is replaced by a selected new content, and the replaced content is then displayed. In the Fade-In mode, a selected content appears gradually. In the Fade-Out mode, a selected content disappears gradually. In the Cross-Fade mode, two different contents overlap for a predetermined time interval while an existing content is switched to a new content. In the Wipe mode, an existing content disappears in up, down, right, and left directions, and then a new content appears from the region where the existing content has disappeared. In the Page-Effect mode, a previous content is switched to a selected content as if turning over the pages. In the Split mode, an existing content is split into pieces to disappear, and then a new selected content appears. In the Zoom mode, a previous content or a new content appears or disappears with a small size, or grows bigger and bigger.

The present invention aims at a more convenient use of contents of digital broadcasting through reduction of content search time of the user and improvement of user's visibility. Accordingly, high-speed editing into a display form for improving the user's visibility will be described hereinafter with reference to a technical support environment.

A user terminal environment applied to the present invention can be implemented even in a simple channel receiver (i.e. a zapper box) for performing only FTA reception, as well as in a standard middleware environment, such as MHP, OCAP, ACAP etc., and in a non-standard middleware environment. In addition, it can be said that the content picture configuration unit 200 is a part of a main chip-set mounted in the user terminal. It is assumed that models of the main chip-set employed in a digital broadcast receiver, which are currently used or are to be used, include Broadcom (all support HD)—BCM7400, BCM7401, BCM7404 and BCM7405, STMicroElectronics—Sti5100, STi1700 and STi7109. All of the assumed models of the main chip-set have been proven to support high-speed editing of a picture of every decoded frame.

The case where a broadcast channel guide is a currently-broadcasted content as in the first embodiment shown in FIG. 3 can be described by using the following mathematical expressions. When the time necessary for channel switching is $T_C$, a typical channel switching can be classified into a first case where a user directly inputs a channel number and a second case where a user continuously inputs a channel up/down key (or direction key). Even though the time taken for channel switching is variable depending on each case, when the number of channels identified by the user is defined as N, it can be said that $T_C \times N$ corresponds to the time required for the user to confirm channels and then select a determined channel. Almost never does an ideal situation occur where a user can identify all desired channels by moving in one direction in one channel. The ideal situation corresponds to a function of surfing only preferred channels. However, according to a conventional channel switching method, since channel selection speed is so slow even in the ideal situation as above, it is difficult to raise the degree of exposure of new channels which are not representative channels any more, only by direct input of channels known to the user by the user. Further, even though the computation formula as above needs time necessary for the user to recognize each displayed channel after each channel is displayed on the display means (or on a screen) of the user terminal, the time necessary for the user to recognize each displayed channel is not considered in the computation formula.

On the contrary, according to the present invention, the total necessary time includes channel switching time $T_C$ required for driving, a time $1/30$ s×N necessary for search by the viewer thereafter, and a time $T_C$ necessary for final determination and selection of one channel. As a result, the total necessary time equals $2 T_C + 1/30$ s×N.

On an assumption that 1.5 seconds are necessary for channel switching and 0.5 seconds are necessary for the user to recognize channels and determine whether to view a program on a desired channel, for the case where the number of channels are '10', '20' and '30', respectively, time required during conventional channel surfing, time required for channel surfing according to the present invention, and time required during channel surfing in the most ideal conditions where two or more tuners and a chip-set for supporting multiple and simultaneous decoding and a Picture-In-Picture (PIP) function are mounted in the digital broadcast receiver (or the user terminal) according to the present invention, are computed as noted in Table 1 below.

TABLE 1

|  | Conventional Channel Surfing | Channel Surfing according to Present Invention | Present Invention with Multi-Tuner/Decoder and PIP |
|---|---|---|---|
| 10 channels | (1.5 s + 0.5 s) × 10 + 1.5 s = 21.5 s | 1.5 s + (1/30 s + 0.5 s) × 10 + 1.5 s = 8.33 s | (1/30 s + 0.5 s) × 10 = 8.33 s |
| 20 channels | (1.5 s + 0.5 s) × 20 + 1.5 s = 41.5 s | 1.5 s + (1/30 s + 0.5 s) × 20 + 1.5 s = 13.67 s | (1/30 s + 0.5 s) × 20 = 10.67 s |
| 30 channels | (1.5 s + 0.5 s) × 30 + 1.5 s = 61.5 s | 1.5 s + (1/30 s + 0.5 s) × 30 + 1.5 s = 19 s | (1/30 s + 0.5 s) × 30 = 16 s |

While Table 1 describes computational examples of simply evaluating a channel surfing time without predicting a special unexpected situation, a scenario in an actual situation is more complex than in the computational examples as above, and accordingly, it is clear that there must be even larger differences among channel surfing times.

Also, comparative results between a conventional technology for implementing a lattice-type moving picture channel list and technology for configuring a multiple moving picture content screen according to the present invention are noted in Table 2 below. Conditions in Table 2 are as follows: 120 channels exist, all of the 120 channels are supported, and a lattice-type moving picture channel list simultaneously provides 12 channels through one screen (one page) which is being currently provided.

TABLE 2

| | Lattice-type Moving Picture Channel List | Picture of Multi Moving Picture Contents according to Present Invention | Remarks |
|---|---|---|---|
| Sending Devices | 10 Multiviewers (12 inputs) 10 SD video encoders 1 audio encoder (120 inputs) | 1 Multiviewer (120 inputs) HD video encoder 1 (MPEG-2 or H.264) 1 audio encoder (120 inputs) | Of the total price of sending devices, weight of the video encoder is high. |
| Bandwidth | 10 SD videos: MPEG-2 4 MHz × 10 = 40 MHz | 1 HD video: about 12 MHz in case of MPEG-2, and about 8 MHz in case of H.264 | |
| Application Speed | Channel switching time is necessary during switching between different videos. | Even if a current (screen) picture is switched to any other picture after application is initiated, only video + graphic editing time is necessary (normally, within 100 ms, and within 0.33 ms in the case of video). | |
| Flexibility | Since a (screen) picture is displayed to a user as it is sent, and only a graphic placed above it is variable, it must be maintained according to a structure of a sent video. | Both a video and a graphic are editable, and thus have excellent flexibility. | |

As noted through the above comparison in terms of a technological difference between the conventional lattice-type moving picture channel list and the multiple moving picture contents picture according to the present invention as in Table 2, and through the above comparison among channel surfing times as in Table 1, it can be said that effects obtained by the application of the present invention are significant.

Figure 4:
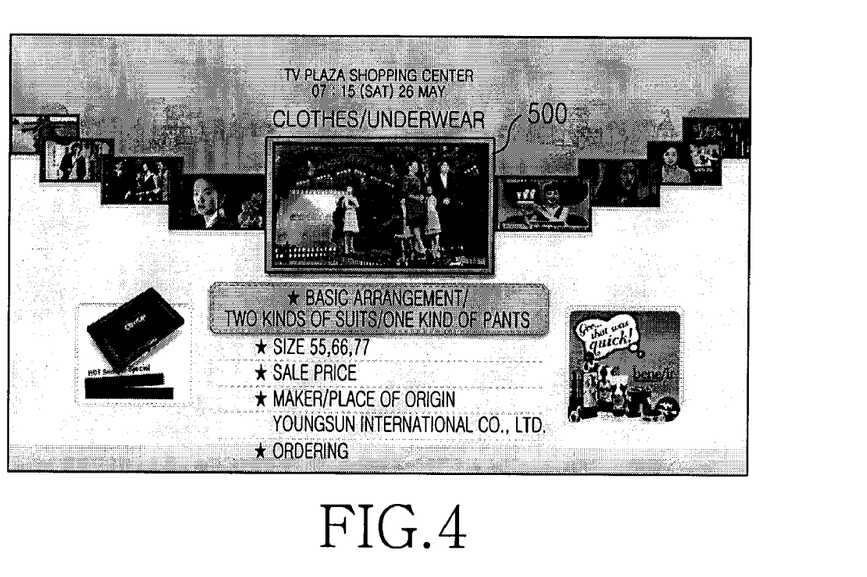
FIG. 4 illustrates a picture example of a second embodiment in which a method for controlling a screen layout of multiple moving picture contents is applied so as to configure a home shopping guide in a digital broadcast receiver according to the present invention.

In addition, a second embodiment illustrated in FIG. 4 as an example of applying the present invention to a home shopping guide, can be realized by means of the same configuration and method as those of the first embodiment depicted in FIG. 3. At present, examples of home shopping channels that can be cited include many channels including CJ Home Shopping, HyunDai Home Shopping, Lotte Home Shopping, NongSu-San Home Shopping, and the like, and various products are broadcasted through the channels. Hence, if a user desires to purchase products through TV home shopping channels, inconvenience is caused to the user in that he/she must check which kinds of products are now on sale, searching for each home shopping channel. Accordingly, as illustrated in FIG. 4, products are classified according to each category with the application of the present invention, and then broadcast programs of respective home shopping channels corresponding to relevant categories are arranged and displayed as an oval circular selection picture on a screen. Also, a focus content selected by the user is displayed at the center of the screen with an enlarged size larger than other moving picture contents, and product information is displayed below the selected focus content, thereby helping purchase selection of the user.

Figure 5:
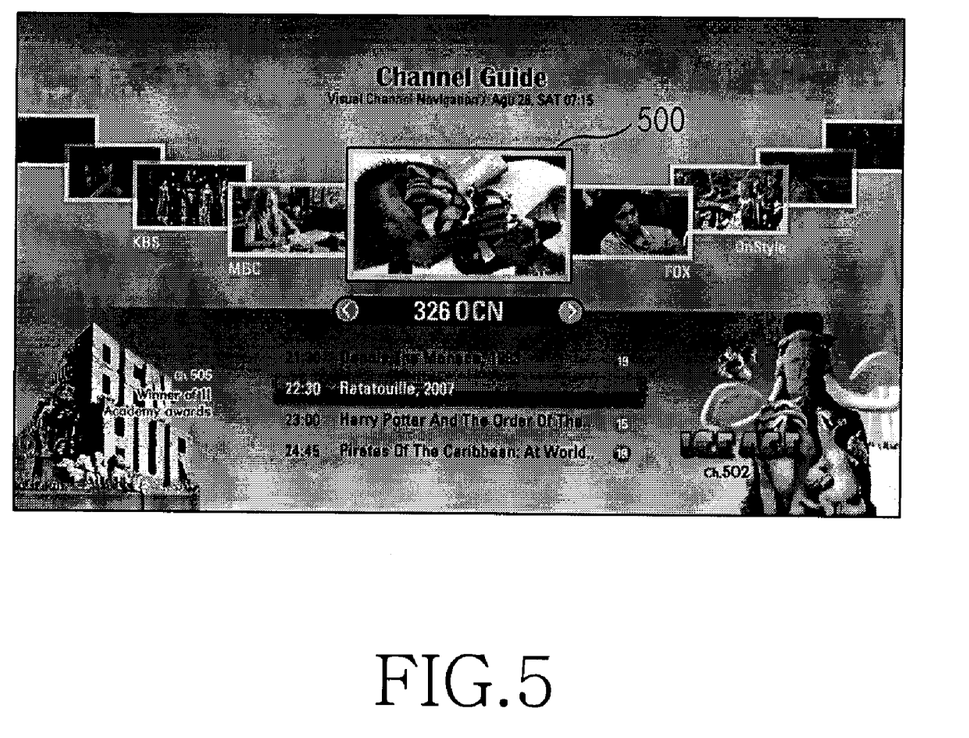
FIG. 5 illustrates a picture example of a third embodiment in which a method for controlling a screen layout of multiple moving picture contents is applied so as to configure an on-demand type service guide in a digital broadcast receiver according to the present invention.

Further, a third embodiment depicted in FIG. 5 as an example of applying the present invention to an on-demand type contents guide corresponds to a service by which a user can select an on-demand content, such as Video On Demand (VOD), Near VOD (NVOD), PushVOD, or Download and Play (D&P), and then can use the selected content either instantly or after a short time delay. Even the on-demand contents as above are selected through a search by the user rather than are found by a direct input of the user. Therefore, it is very important to provide information on various contents to the user, so as to induce the user to select a content. Conventionally, information on various contents is broadcasted on a special introduction channel for on-demand, or the user separately searches for contents information to be used and then acquires the desired contents information. However, in the case of utilizing the introduction channel, the user does not know when desired contents are broadcasted. Therefore, it is difficult to expect significant effects due to the one-side property of broadcasting. Even when the user separately searches for information, the level of the information corresponds to only posters and text, and thus it is not easy to get enough information to satisfy the user. Accordingly, by providing on-demand contents through a multi-moving picture content screen as illustrated in FIG. 5, it is possible to provide information on multiple contents desired by the user within a short period of time.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

For example, a circular selection picture of multiple moving picture contents can be arranged not only in an oval form as in the embodiments of the present invention described above, but also in various curved forms, such as a hemi-arc form, a wave form, and a round form. Additionally, in the arrangement of the circular selection picture, various changes in form can be made. For example, the circular selection picture may be arranged horizontally lengthwise in a lower part of a screen, or vertically lengthwise on the right and left side of the screen.

According to the present invention, in searching for multiple moving picture contents provided by a digital broadcasting system, it is possible to improve a user's convenience.

Also, in an apparatus and a method according to the present invention, a lattice-type moving picture channel list provided for the search of moving picture contents from a digital broadcasting system is converted into a curved-type circular selection picture, and the converted curved-type circular selection picture is then displayed for search or selection of a moving picture content by a user.

Further, according to the present invention, in the digital broadcast receiver, the visibility of a search screen of multiple moving picture contents can not only be improved, but switching time between search pictures can also be shortened.

What is claimed is:

1. An apparatus for controlling a screen layout in a digital broadcast receiver, the apparatus comprising:
   a data reception conversion unit for receiving head-end side data including configuration data of lattice-type moving picture contents sent via a broadcasting network and then converting the received head-end side data into content picture configuration data; and
   a content picture configuration unit for arranging multiple moving picture contents through a curved-type circular selection picture on a display means of a user terminal by using the content picture configuration data, for editing the multiple moving picture contents so as to display a focus moving picture content selected by a user in an enlarged size larger than other moving picture contents, and for arranging the moving picture contents along a curve of the curved-type circular selection picture in such a manner that partial regions of the multiple moving picture contents overlap each other, wherein the focus moving picture content has a largest size, and the farther each moving picture content from the focus moving picture content is, the smaller each moving picture content becomes,
   wherein the content picture configuration unit comprises a search picture setting unit for generating a screen layout control signal from the content picture configuration data and user's content selection data input to a key input reception unit, and then providing the generated screen layout control signal to an output video editing unit, and
   wherein the graphic editing unit edits a picture graphic by using the screen layout control signal, so as to display a graphic display picture other than multiple moving picture contents to be displayed on the display means of the user terminal and additional information about the focus moving picture contents selected by the user in a region excluding the multiple moving picture contents.

2. The apparatus as claimed in claim 1, wherein the content picture configuration unit further comprises a video/graphic merging unit for merging a picture graphic output from the graphic editing unit with multiple moving picture contents output from the output video editing unit, thereby generating a picture to be displayed.

3. The apparatus as claimed in claim 1, which further comprises an audio configuration unit for receiving audio configuration data from the data reception conversion unit, and then outputting audio data matching with a moving picture content selected by a user among the received audio configuration data.

4. The apparatus as claimed in claim 1, wherein the head-end side data comprises a media source delivered to the content picture configuration unit so as to define a display type of the display means of the user terminal.

5. The apparatus as claimed in claim 1, wherein a display switching of the focus content is performed in any display switching mode selected from among normal, fade-in, fade-out, cross-fade, wipe, page-effect, split, and zoom modes.

6. A method for controlling a screen layout in a digital broadcast receiver, the method comprising the steps of:
   receiving head-end side data including configuration data of lattice-type moving picture contents sent via a broadcasting network, and converting the received head-end side data into content picture configuration data;
   editing the content picture configuration data and configuring a curved-type circular selection picture so as to display the edited content picture configuration data through the curved-type circular selection picture on a display means of a user terminal, the editing of the content picture configuration data and the configuring of the circular selection picture including:
      generating a screen layout control signal from the content picture configuration data and user's content selection data input to a key input reception unit, and providing the generated screen layout control signal to an output video editing unit and a graphic editing unit;
   editing a picture graphic by using the screen layout control signal so that a graphic display picture other than multiple moving picture contents to be displayed on the display means of the user terminal and additional information about the focus content is displayed in a region other than a region displaying the multiple moving picture contents;
   displaying the configured curved-type circular selection picture containing the moving picture contents on the display means of the user terminal;
   arranging multiple moving picture contents through a circular selection picture on the display means of the user terminal by using the screen layout control signal; and
   editing the moving picture contents so that a focus content selected by a user can be displayed in an enlarged size larger than other moving picture contents,
   wherein the moving picture contents are arranged in such a manner that the focus content has a largest size, and the farther each moving picture content from the focus content is, the smaller each moving picture content becomes,
   wherein the moving picture contents are arranged along a curve of the curved-type circular selection picture in such a manner that partial regions of the multiple moving picture contents overlap each other.

7. The method as claimed in claim 6, further comprising a step of merging a picture graphic output in the step of editing a picture graphic by using screen layout control signal with multiple moving picture contents output in the step of arranging multiple moving picture contents, thereby generating a picture to be displayed on the display means of the user terminal.

8. The method as claimed in claim 6, further comprising the steps of:
   receiving audio configuration data together with the head-end side data; and
   outputting audio data matching with a moving picture content selected by a user among the received audio configuration data.

9. The method as claimed in claim 6, wherein the head-end side data comprises a media source for defining a display type of the display means of the user terminal.

10. The method as claimed in claim 6, wherein a display switching of the focus content is performed in any display switching mode selected from among normal, fade-in, fade-out, cross-fade, wipe, page-effect, split, and zoom modes.

* * * * *